Patented Apr. 7, 1953

2,634,277

UNITED STATES PATENT OFFICE 2,634,277

HYDROLYSIS OF 21-ACYLOXYPREGNENES

Huang Minlon, Metuchen, and Max Tishler, Westfield, N. J., assignors to Merck & Co., Inc., Rahway, N. J., a corporation of New Jersey No Drawing. Application December 22, 1951, Serial No. 263,012

9 Claims. (Cl. 260—397.4)

This invention is concerned generally with the hydrolysis of esters of cortisone and hydrocortisone. More particularly, it relates to the alkaline hydrolysis of $\Delta^4$-3,11,20-triketo-17$\alpha$-hydroxy-21-acyloxy-pregnenes to produce $\Delta^4$-3,11,-20-triketo-17$\alpha$,21-dihydroxy-pregnene otherwise known as cortisone, free alcohol, and of $\Delta^4$-3,20-diketo-11,17$\alpha$-dihydroxy-21-acyloxy-pregnenes to produce $\Delta^4$-3,20-diketo-11,17$\alpha$,21-trihydroxy-pregnene, or hydrocortisone. The C-21 free alcohols are preferred for many therapeutic uses over the 21-acyl derivatives of cortisone and hydrocortisone, such as the corresponding acetates. For example, the free alcohols are relatively soluble in water, and are thus better adapted for intravenous administration than are the less soluble acetates. Moreover, opthalmic solutions of cortisone, free alcohol, are preferred over suspensions of the less soluble cortisone acetate, in view of the fact that cortisone acetate suspensions tend to be irritating.

The hydrolysis of $\Delta^4$-3,11,20-triketo-17$\alpha$-hydroxy-21-acyloxy-pregnene has been carried out heretofore utilizing acid or weakly alkaline hydrolyzing agents, but these prior art procedures have ordinarily required about two days for the hydrolysis operation, and have resulted in the obtainment of the desired cortisone, free alcohol, in a yield of about only 75% of that theoretically obtainable. It was not previously considered practicable to employ strongly alkaline conditions for the hydrolysis of $\Delta^4$-3,11,20-triketo-17$\alpha$-hydroxy-21-acyloxy-pregnenes or of $\Delta^4$-3,20-diketo-11,17$\alpha$-dihydroxy-21-acyloxy-pregnenes in view of the well known fact that steroids, having in the 17-position of the molecule a side chain of the formula —CHCOCH$_2$OR or

—C(OH)COCH$_2$OR (wherein R is acyl), are extremely sensitive to strong alkalies, and that treatment of steroids having this structure with such reagents ordinarily leads to decomposiiton and rearrangement reactions.

We have now discovered, however, that, when a $\Delta^4$-3,11,20-triketo-17$\alpha$-hydroxy-21-acyloxy pregnene, such as cortisone acetate, or a $\Delta^4$-3,20-diketo-11,17$\alpha$-dihydroxy-21-acyloxy-pregnene, such as hydrocortisone acetate, is reacted in alcohol solution, with approximately 1 equivalent of a strong alkali, the desired free alcohol is produced in a yield up to approximately 92% of that theoretically obtainable. As the strong alkali, we ordinarily utilize an alkali metal hydroxide such as potassium hydroxide, an alkali metal alkoxide such as sodium ethoxide, sodium methoxide, and the like. The hydrolysis reaction is preferably carried out at room temperature (i. e. at a temperature of about 25° C.) while maintaining the reaction solution in contact with an oxygen-free atmosphere, as for example, hydrogen, nitrogen, and the like. Under these reaction conditions, the hydrolysis reaction is substantially complete after a reaction period of about four to eight minutes.

Upon completion of the hydrolysis reaction the reaction mixture is made acid to litmus, preferably by the addition of a weak acid such as acetic acid, and the resulting mixture is evaporated substantially to dryness. The residual material is then slurried with water, and the crystalline free alcohol is recovered from the suspension thus obtained.

The following examples illustrate methods of carrying out the present invention, but it is to be understood that these examples are given for purposes of illustration and not of limitation.

Example 1

One gram (0.00248 mole) of cortisone acetate was dissolved in 25 ml. of warm absolute methanol, and the solution was cooled to room temperature. To this solution was added 10 ml. of a methanolic solution of sodium methoxide containing one equivalent of NaOCH$_3$ (0.00248 mole) and the solution, which immediately turned pale yellow, was swirled for a period of 4 minutes. A stream of nitrogen was directed into the vessel containing the solution so that the nitrogen would sweep the surface of the solution both during the operation of dissolving the cortisone acetate and during the subsequent reaction of the cortisone acetate solution with the methanolic sodium methoxide.

Immediately following the 4 minute reaction period, 1 ml. of a water-methanol solution (containing 1 equivalent of water) was added to the methanolic solution, and the swirling continued for an additional 3 minute period. Twenty-five ml. of ice water was then added to the reaction solution and, within an additional 1 minute period, 1.5 ml. of aqueous acetic acid solution containing 1 equivalent of acetic acid per ml. was added to the aqueous mixture, whereupon the yellow color of the solution disappeared. The resulting solution, which was acid to litmus, was evaporated to dryness in vacuo at a temperature between about 30 and 45° C., the residual material was triturated with 50 ml. of water, and the resulting slurry was cooled to about 0° C.

The fine white solid which precipitated was recovered by filtration, washed with ice water and dried to give 0.838 g. of substantially pure cortisone (free alcohol); M. P. 219–220° C., yield approximately 93.7% of theory.

*Example 2*

One gram (0.00248 mole) of cortisone acetate was dissolved in 25 ml. of warm absolute methanol, and the solution was cooled to room temperature. To this solution was added 10 ml. of a methanolic solution of potassium hydroxide containing one equivalent of KOH (0.00248 mole) and the solution, which immediately turned pale yellow, was swirled for a period of 4 minutes. A stream of nitrogen was directed into the vessel containing the solution so that the nitrogen would sweep the surface of the solution both during the operation of dissolving the cortisone acetate and during the subsequent reaction of the cortisone acetate solution with the methanolic potassium hydroxide.

Immediately following the 4 minute reaction period, 1 ml. of a water-methanol solution (containing 1 equivalent of water) was added to the methanolic solution, and the swirling continued for an additional 3 minute period. Twenty-five milliliters of ice water was then added to the reaction solution and, within an additional 1 minute period, 1.5 ml. of aqueous acetic acid solution containing 1 equivalent of acetic acid per ml. was added to the aqueous mixture, whereupon the yellow color of the solution disappeared. The resulting solution, which was acid to litmus, was evaporated to dryness in vacuo at a temperature between about 30 and 45° C., the residual material was triturated with 50 ml. of water, and the resulting slurry was cooled to about 0° C. The fine white solid which precipitated was recovered by filtration, washed with ice water, and dried to give 0.843 g. of substantially pure cortisone (free alcohol); M. P. 219–220° C.; yield approximately 94.2% of theory.

*Example 3*

A solution containing 6.48 g. (0.12 M) of sodium methoxide dissolved in 3000 ml. of absolute methanol was added, with agitation, to 48.30 g. (0.12 M) of cortisone acetate; all components were maintained in contact with an atmosphere of hydrogen both prior to and during the addition of the sodium methoxide to the cortisone acetate. The mixture of cortisone acetate and methanolic sodium methoxide was then stirred rather vigorously, in contact with a hydrogen atmosphere (maintained by passing a slow stream of hydrogen over the surface of the solution), for a period of about 10 minutes, during which time all of the cortisone acetate dissolved giving a yellow solution. At the end of the 10 minute reaction period, 10 ml. of glacial acetic acid was added to the solution which turned a pale-green color, and was found by tests to be acid to moist, blue litmus paper. The agitation of the solution and the flow of hydrogen were discontinued, and the acidified reaction solution was filtered to remove insoluble impurities. The filtered solution was evaporated in vacuo nearly to dryness to give a crystalline residue.

Three thousand milliliters of cold water were added, with swirling, to this crystalline product, and the resulting slurry was allowed to stand for a period of about 1 hour at a temperature of 5° C. with occasional swirling. The slurry was filtered, and the crystalline product was washed with two 100 ml. portions of cold water, and was then slurried with three 250 ml. portions of cold water. The final washing was neutral to alkacid paper. The washed product was then dried to constant weight to give 39.58 g. of substantially pure cortisone (free alcohol); M. P. 225.0–226.8° C.; yield approximately 91.5% of theory.

The aqueous mother liquors were extracted with ethyl acetate, the extracts were washed with water, and the ethyl acetate solution was evaporated in vacuo to small volume and cooled to 25° C. to give an additional yield of cortisone as a light tan crystalline material. The product was purified by recrystallization from methanol to give substantially pure cortisone (free alcohol); M. P. 224–225.5° C. in an amount such that the total yield of cortisone was approximately 93.6% of that theoretically obtainable.

*Example 4*

A solution of 1.0 g. (0.00247 M) of $\Delta^4$-3,20-diketo-11,17α-dihydroxy-21-acetoxy pregnene (hydrocortisone acetate) in 100 ml. of absolute methanol was prepared by heating the mixture under reflux and then allowing the resulting solution to cool slowly to room temperature. During the following steps the solution was swirled continuously, and its surface swept with nitrogen. Ten milliliters of methanolic sodium methoxide (0.00247 M NaOCH$_3$ per 10 ml. solution) was added to the methanol solution of hydrocortisone acetate, whereupon the solution became faintly yellow. After five minutes 1.0 ml. of a methanol solution containing 0.045 g. (0.00247 M) of water per ml. was added to the reaction solution, and after 3 minutes, 50 ml. of water was added, followed immediately by 1.5 ml. of a methanol solution containing 0.148 g. (0.00247 M) of acetic acid per ml. The solution became water-white, and stirring and nitrogen were discontinued.

The solvents were evaporated in vacuo, 10 ml. of water was added, and the resulting suspension of white solid cooled and filtered. The crude product was washed three times with 5 ml. portions of ice-water, and dried on a steam bath to yield a granular solid, M. P. 206–212° C.

This crude material was recrystallized from acetone-ethyl acetate to give substantially pure white, crystalline $\Delta^4$ - 3,20 - diketo - 11,17α,21-trihydroxy pregnene (hydrocortisone), M. P. 213–216° C.

Various changes and modifications may be made in carrying out the present invention without departing from the spirit and scope thereof. Insofar as these changes and modifications are within the purview of the annexed claims, they are to be considered as part of my invention.

We claim:

1. The process which comprises reacting a $\Delta^4$ - 3,20 - diketo - 17α-hydroxy-21-acyloxy-pregnene compound of the formula:

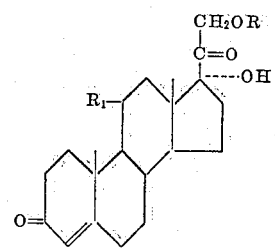

wherein R is an acyl radical, and R$_1$ is a radical selected from the group which consists of keto and hydroxy radicals, with approximately one equivalent of a strong alkali, said reaction being carried out by bringing the reactants together in an alcoholic medium substantially protected from exposure to oxygen, thereby producing the corresponding $\Delta^4$ - 3,20-diketo-17α,21-dihydroxy-pregnene compound having the formula:

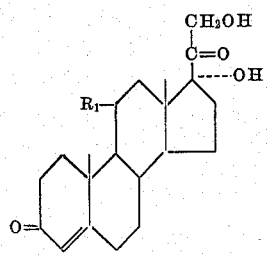

wherein $R_1$ has the significance hereinabove defined.

2. The process which comprises reacting $\Delta^4$-3,11,20 - triketo - 17α - hydroxy-21-acyloxy-pregnene with approximately 1 equivalent of an alkali metal hydroxide, said reaction being carried out by bringing the reactants together in a medium comprising a lower aliphatic alcohol in contact with an oxygen-free atmosphere, thereby producing $\Delta^4$-3,20 - diketo-11,17α,21-trihydroxy-pregnene.

3. The process which comprises reacting $\Delta^4$-3,20 - diketo - 11,17α-dihydroxy-21-acyloxy-pregnene with approximately 1 equivalent of an alkali metal alkoxide, said reaction being carried out by bringing the reactants together in a medium comprising a lower aliphatic alcohol in contact with an oxygen-free atmosphere, thereby producing $\Delta^4$-3,20 - diketo - 11,17α,21-trihydroxy-pregnene.

4. The process which comprises reacting $\Delta^4$-3,11,20 - triketo - 17α - hydroxy-21-acyloxy-pregnene with approximately 1 equivalent of an alkali metal alkoxide, said reaction being carried out by bringing the reactants together in a medium comprising a lower aliphatic alcohol in contact with an oxygen-free atmosphere, thereby producing $\Delta^4$-3,20 - diketo-11,17α,21-trihydroxy-pregnene.

5. The process which comprises reacting $\Delta^4$-3,20 - diketo - 11,17α-dihydroxy-21-acyloxy-pregnene with approximately 1 equivalent of an alkali metal alkoxide, said reaction being carried out by bringing the reactants together in a medium comprising a lower aliphatic alcohol in contact with an oxygen-free atmosphere, thereby producing $\Delta^4$-3,20 - diketo - 11,17α,21-trihydroxy-pregnene.

6. The process which comprises reacting $\Delta^4$-3,11,20 - triketo - 17α-hydroxy-21-acetoxy-pregnene with approximately 1 equivalent of potassium hydroxide, said reaction being carried out by bringing the reactants together in methanol in contact with a nitrogen atmosphere, thereby producing $\Delta^4$ - 3,11,20-triketo-17α,21-dihydroxy-pregnene.

7. The process which comprises reacting $\Delta^4$-3,11,20 - triketo - 17α-hydroxy-21-acetoxy-pregnene, in methanol under a hydrogen atmosphere, with approximately 1 equivalent of sodium methoxide to produce $\Delta^4$-3,11,20-triketo-17α,21-dihydroxy-pregnene.

8. The process which comprises reacting $\Delta^4$-3,20 - diketo-11,17α-dihydroxy-21-acetoxy-pregnene, in methanol under a nitrogen atmosphere, with approximately 1 equivalent of sodium methoxide to produce $\Delta^4$-3,20-diketo-11,17α,21-trihydroxy-pregnene.

9. The process which comprises reacting a $\Delta^4$-3,20 - diketo - 17α-hydroxy-21-acyloxy-pregnene compound of the formula:

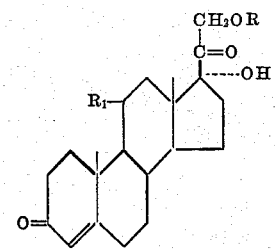

wherein R is an acyl radical, and $R_1$ is a radical selected from the group which consists of keto and hydroxy radicals, with approximately one equivalent of a strong alkali, said reaction being carried out by bringing the reactants together in an alcoholic medium under a nitrogen atmosphere, thereby producing the corresponding $\Delta^4$ - 3,20-diketo-17α,21-dihydroxy-pregnene compound having the formula:

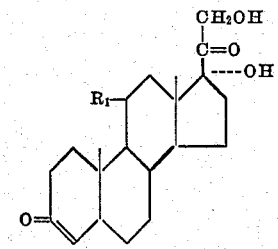

wherein $R_1$ has the significance hereinabove defined.

HUANG MINLON.
MAX TISHLER.

No references cited.